(12) United States Patent
Winberry et al.

(10) Patent No.: US 8,328,411 B2
(45) Date of Patent: Dec. 11, 2012

(54) BEVERAGE MIXING APPARATUS

(76) Inventors: Steven N. Winberry, Whittier, CA (US); Richard E. Winberry, Whittier, CA (US)

( * ) Notice: Subject to any disclaimer, the term of this patent is extended or adjusted under 35 U.S.C. 154(b) by 580 days.

(21) Appl. No.: 12/620,580

(22) Filed: Nov. 17, 2009

(65) Prior Publication Data
US 2010/0126353 A1  May 27, 2010

Related U.S. Application Data

(60) Provisional application No. 61/199,872, filed on Nov. 21, 2008.

(51) Int. Cl.
*B01F 13/00* (2006.01)
(52) U.S. Cl. .......................... 366/212; 99/275
(58) Field of Classification Search .......... 366/108–128, 366/197–219, 130; 99/275; 426/592; 220/568
See application file for complete search history.

(56) References Cited

U.S. PATENT DOCUMENTS

| | | | | |
|---|---|---|---|---|
| 1,992,657 A | * | 2/1935 | Fontan | 366/130 |
| 4,619,532 A | * | 10/1986 | Schmidt, III | 366/110 |
| 5,833,362 A | * | 11/1998 | Shepard | 366/111 |
| 5,927,553 A | * | 7/1999 | Ford | 222/129.4 |
| 6,439,757 B2 | * | 8/2002 | Lloyd | 366/130 |
| 7,604,392 B2 | * | 10/2009 | Brezinsky et al. | 366/211 |
| 2007/0261566 A1 | * | 11/2007 | Varney et al. | 99/300 |
| 2008/0034977 A1 | * | 2/2008 | Halle et al. | 99/323.3 |
| 2008/0165615 A1 | * | 7/2008 | Eklind | 366/138 |
| 2008/0232188 A1 | * | 9/2008 | Brezinsky et al. | 366/211 |
| 2009/0067281 A1 | * | 3/2009 | Little | 366/209 |
| 2010/0126353 A1 | * | 5/2010 | Winberry et al. | 99/275 |
| 2012/0250448 A1 | * | 10/2012 | Choi | 366/130 |

FOREIGN PATENT DOCUMENTS

CH         631066 A5 * 7/1982

* cited by examiner

*Primary Examiner* — Charles E Cooley
(74) *Attorney, Agent, or Firm* — CIONCA Law Group P.C.; Marin Cionca

(57) ABSTRACT

Embodiments of the invention are directed to a beverage mixing apparatus which may be used to prepare alcoholic or non-alcoholic beverage combination cocktails. In one embodiment, the beverage mixing apparatus includes an upper assembly capable of supporting a plurality of tapered vessels having a first size and a lower assembly capable of supporting a plurality of tapered vessels having a second size. The upper assembly includes a handle assembly which functions like a plunger to submerge and release the plurality of tapered vessels having a first size into the plurality of tapered vessels having a second size when force is applied thereto.

20 Claims, 7 Drawing Sheets

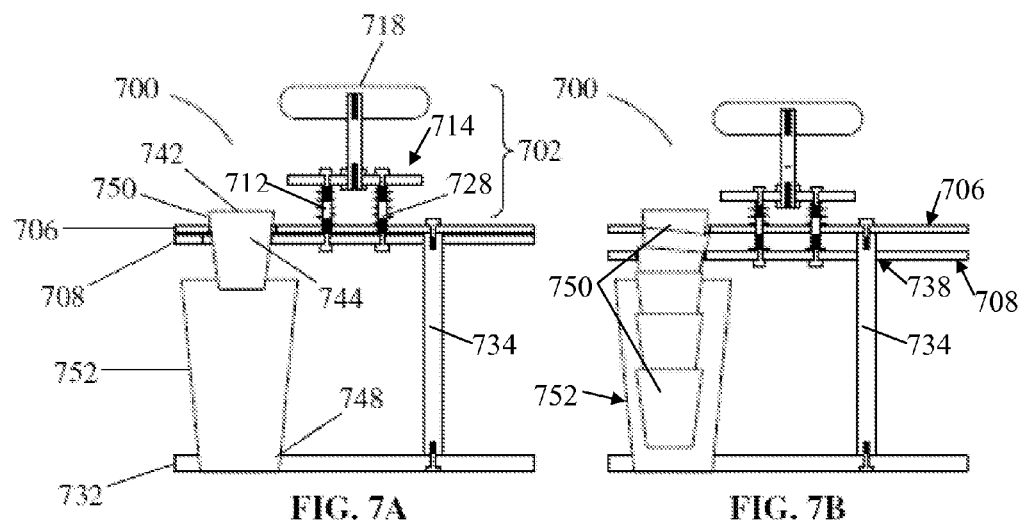
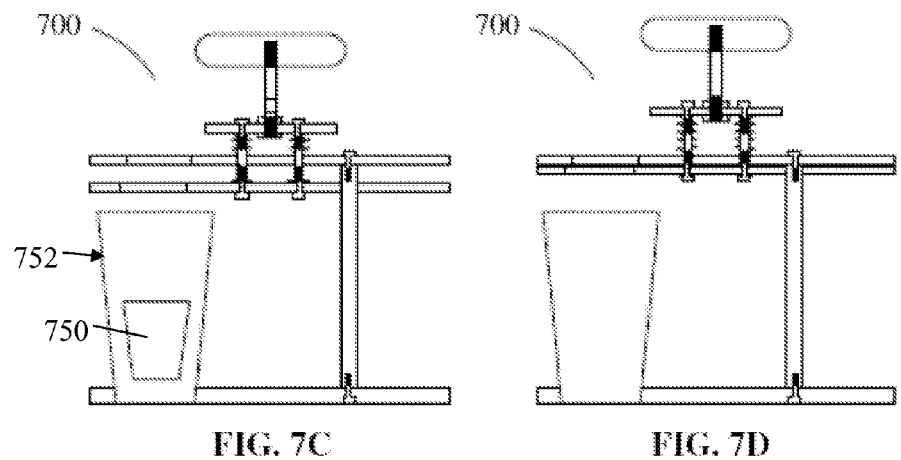

BEVERAGE MIXING APPARATUS

CLAIM OF PRIORITY

This application claims the benefit of U.S. Provisional Application No. 61/199,872 entitled "Party Bomb" filed Nov. 21, 2008.

FIELD OF INVENTION

Beverage mixing apparatuses.

BACKGROUND OF INVENTION

Bartenders and party hosts are generally tasked with tending to the entertainment of guests and/or patrons. Bartenders, and often party hosts, may provide a variety of alcoholic and non-alcoholic beverages to their guests and/or patrons. Mixed drinks or cocktails are generally popular and requested, and the bartender or party host may use a variety of appliances or devices to prepare such drinks. One popular appliance is the electric blender which may be used to make blended cocktails, such as margaritas, daiquiris or pina coladas. One popular device is the cocktail shaker which is generally includes a drinking glass-shaped device (usually metal) which tapers toward the bottom and a built-in strainer with a cap. The cap can often be used as a measure for spirits or other liquids. Cocktail shakers may be used to make, for example, martinis or mojitos.

One particular cocktail that has gained popularity recently is the "bomb" cocktail. "Bomb" cocktails are generally made by submerging a shot glass of hard liquor into a larger glass of full or half-full of beer, soda or any other non-alcoholic beverage. A bartender or other drink preparer may prepare a "bomb" cocktail by filling the shot glass with hard liquor, then filling or partially filling the larger glass with beer, soda or other beverage, and then dropping the filled shot glass into the larger glass. The bar patron or partygoer then "shoots" the combined drink, i.e., consumes the entire cocktail at once. One problem associated with "bomb" cocktails is that they are messy to prepare. This is due to that the shot glass is dropped into the larger glass often resulting in spills.

SUMMARY OF INVENTION

A beverage mixing apparatus, comprising: an upper assembly having: (a) an upper plate; (b) a lower plate adjacent the upper plate; and (c) a handle assembly having a handle assembly plate separated from the upper and lower plates by a predetermined distance by a plurality of spacer bars connecting the handle assembly plate to the upper and lower plates, the spacer bars having compression springs thereabout, the lower plate to separate from the upper plate in a downward direction when pressure is applied to the handle assembly plate; and a lower assembly having a base plate separated from the lower and upper plates of the upper assembly by a predetermined distance by a plurality of support bars connecting the base plate to the lower and upper plates is herein disclosed.

The beverage mixing apparatus may further include a plurality of upper plate openings symmetrically spaced about an inner periphery of the upper plate. The beverage mixing apparatus may further include a plurality of lower plate openings symmetrically spaced about an inner periphery of the lower plate. The plurality of upper plate openings and the plurality of lower plate openings may number the same and may be in substantial alignment with one another, the plurality of lower plate openings off-set relative to the plurality of upper plate openings. The plurality of upper and lower plate openings may be capable of receiving and suspending a plurality of tapered vessels of a first size. The beverage mixing apparatus may further include a plurality of cut-outs on the base plate, the plurality of cut-outs in substantial alignment with the plurality of upper and lower plate openings. The plurality cut-outs may be capable of receiving and suspending a plurality of tapered vessels of a second size. The tapered vessels of the first size may be smaller than the tapered vessels of the second size. The beverage mixing apparatus may further include a handle connected to the handle assembly by a support shaft. When a downward force is applied to the handle assembly plate, the lower plate may move in a downward direction guided by the plurality of support bars and may release the tapered vessels of the first size into the tapered vessels of the second size.

A beverage mixing apparatus, comprising: (a) an upper disc having a plurality of openings symmetrically spaced about an inner periphery of the upper disc, each opening defining a center wherein a distance between each center and an edge of the upper disc is a distance of a first length; (b) a lower disc adjacent the upper disc, the lower disc having a plurality of openings symmetrically spaced about an inner periphery of the lower disc, each opening defining a center wherein a distance between each center and an edge of the disc is a distance of a second length; (c) a handle assembly having a support shaft, the support shaft passing through a center opening in the upper disc, the handle assembly capable of moving between a first position and a second position; and (d) a base disc separated from the lower and upper discs by a predetermined distance by a plurality of support bars connecting the base disc to the lower and upper disc, each support bar having a compression spring thereon, the base disc having a plurality of cut-outs symmetrically spaced about an inner periphery of the base disc is herein disclosed.

The first length may be longer than the second length. The plurality of openings on the upper disc, the plurality of openings on the lower disc and the plurality of cut-outs on the base disc may be in substantial alignment with one another. The lower disc may be adapted to move between a first position and a second position about the plurality of support bars for a predetermined length of the support bars when pressure is applied thereto. When the lower disc is in motion, the upper disc may remain stationary. Each opening on the upper and lower discs may be in substantial alignment relative to one another and may be capable of receiving and suspending a tapered vessel of a first size. Each cut-out may be in substantial alignment with each opening on the upper and lower discs and may be capable of receiving and suspending a tapered vessel of a second size wherein the tapered vessel of the first size is smaller than the tapered vessel of the second size. When a downward force is applied to the handle assembly, the lower disc may move in a downward direction guided by the plurality of support bars and releases the tapered vessels of the first size into the tapered vessels of the second size.

A method of preparing a mixed cocktail, comprising: (a) positioning a plurality of tapered vessels of a first size within a plurality of openings on an upper plate and on a lower plate, the plurality of openings in substantial alignment relative to one another, the upper plate and the lower plate in contact with each other; (b) positioning a plurality of tapered vessels of a second size within a plurality of cut-outs on a base plate, the base plate connected to the upper and lower plates by a plurality of support bars passing through a plurality of corresponding symmetrically spaced apertures on each plate; (c) applying pressure to a handle assembly connected to the upper and lower plates; and (d) causing the tapered vessels of the first size to rest within the tapered vessels of the tapered vessels of the second size is herein disclosed. The method may further include: (e) pouring liquid into the tapered vessels of the first size; and (f) pouring liquid into the tapered vessels of the second size.

BRIEF DESCRIPTION OF DRAWINGS

FIGS. 7A-7D illustrate a sequence of operating a beverage mixing assembly according to an embodiment of the invention.

DETAILED DESCRIPTION

The following detailed description is of the best currently contemplated modes of carrying out the invention. The description is not to be taken in a limiting sense, but is made merely for the purpose of illustrating the general principles of the invention.

Embodiments of the invention are directed to a beverage mixing apparatus which may be used to prepare alcoholic or non-alcoholic beverage combination cocktails. In one embodiment, the beverage mixing apparatus includes an upper assembly capable of supporting a plurality of tapered vessels having a first size and a lower assembly capable of supporting a plurality of tapered vessels having a second size. The upper assembly includes a handle assembly which functions like a plunger to submerge and release the plurality of tapered vessels having a first size into the plurality of tapered vessels having a second size when force is applied thereto.

Figure 1:
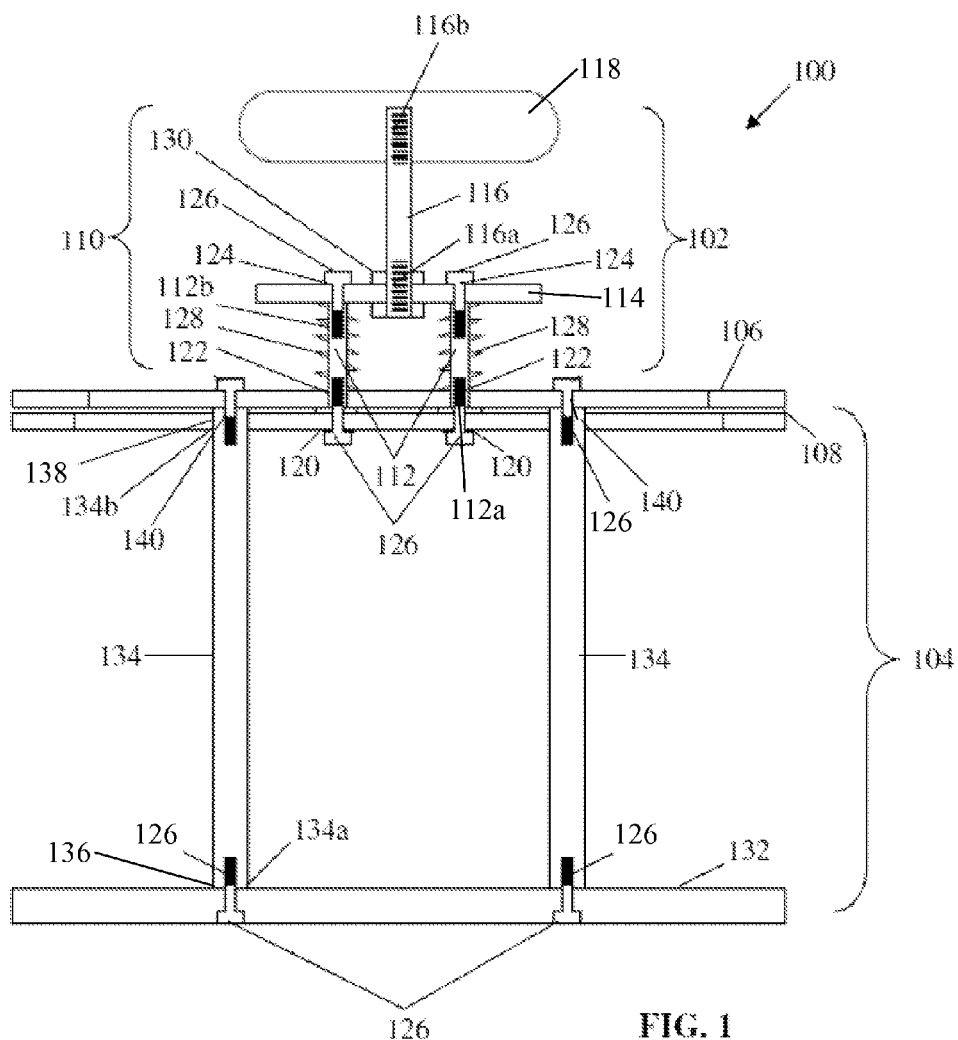
FIG. 1 illustrates a front cross-sectional view of a beverage mixing apparatus according to an embodiment of the invention.

FIG. 1 illustrates a front cross-sectional view of a beverage mixing apparatus according to an embodiment of the invention. In one embodiment, beverage mixing apparatus 100 includes an upper assembly 102 connected to a lower assembly 104 (explained in more detail below). Upper assembly 102 may include an upper plate 106 (or, upper "captive" plate, hereinafter used interchangeably) adjacent to a lower plate 108 (or, lower "release" plate, hereinafter used interchangeably); however, it should be appreciated that the upper plate 106 is not statically connected to lower plate 108 (explained in more detail below). Both upper plate 106 and lower plate 108 may be approximately disc-like (i.e., circular) in configuration; however, other suitable geometric configurations are within the scope of the invention. In the embodiment in which upper and lower plates 106, 108 are disc-like in configuration, upper plate 106 and lower plate 108 may be substantially or completely the same size, i.e., upper plate 106 and lower plate 108 may both have substantially or completely the same diameter. For example, upper plate 106 and lower plate 108 may be between about eight (8) inches and twelve (12) inches in diameter, in one embodiment, approximately ten (10) inches in diameter. Both upper plate 106 and lower plate 108 may include a plurality of openings (not shown, see FIGS. 4A-4C) symmetrically spaced about an inner periphery thereof. The number of openings on the upper plate 106 may be the same as the number of openings on the lower plate 108. Furthermore, the openings on the upper plate 106 may be substantially aligned with, yet slightly off-set relative to, the openings on the lower plate 108 (explained in more detail below, see FIGS. 4A-4C). The openings may be capable of receiving a tapered vessel.

In one embodiment, the lower plate 108 is held adjacent to the upper plate 106 in a "captive" position (explained in more detail below) by a handle assembly 110 engaging upper and lower plates 106, 108 at or near centers thereof. Handle assembly 110 may generally include one or more vertically-oriented spacer bars 112, a handle assembly plate 114 (disc-shaped or any other suitable geometric configuration), a support shaft 116 and a handle 118. In one embodiment, handle assembly 110 includes four (4) vertically-oriented spacer bars 112 originating from four (4) inner apertures 120 on lower plate 108, passing through four (4) corresponding inner apertures 122 on upper plate 106, and terminating at four (4) corresponding apertures 124 in handle assembly plate 114. Generally, each spacer bar 112 may have a first end 112a and a second end 112b.

Each set of apertures 120, 122 and 124 (and therefore spacer bars 112) may be symmetrically spaced from one another and from the centers of lower plate 108, upper plate 106 and handle assembly plate 114, respectively. Furthermore, apertures 120, 122 and 124 may be substantially aligned to one another (i.e., in the y-direction). Fastening mechanisms, such as screws 126, may secure spacer bars 112 to lower plate 108 by passing through inner apertures 120 from a bottom surface of lower plate 108 and threadedly engaging with first ends 112a of spacer bars 112. It should be appreciated that, in this configuration, spacer bars 112 simultaneously pass through inner apertures 122 of upper plate 106. In some embodiments, a compression spring 128 may be positioned about each spacer bar 112. Conversely, fastening mechanisms, such as screws 126, may secure spacer bars 112 to handle assembly plate 114 by passing through apertures 124 from a top surface of handle assembly plate 114 and threadedly engaging with second ends 112b of spacer bars 112.

Handle assembly plate 114 may include a center opening therethrough to receive a first end 116a of support shaft 116, the support shaft 116 having a first threaded end 116a and a second threaded end 116b. For example, first end 116a of support shaft 116 may secure to handle assembly plate 114 by passing through the center opening (which may be threaded) and secured thereto by one or more fastening mechanisms 130, including, but not limited to, threaded nuts. Conversely, second end 116b of support shaft 116 may be secured to handle 118 by threadedly engaging with a center threaded recess on a bottom surface of handle 118.

Continuing to refer to FIG. 1, lower assembly 104 may include a base plate 132 with a plurality of symmetrically-oriented, contoured cut-outs (not shown, see FIGS. 4A-4C) about a periphery thereof. In some embodiments, the symmetrically-oriented, contoured cut-outs are capable of receiving a tapered vessel. Base plate 132 may be approximately disc-like (i.e., circular) in configuration; however, other suitable geometric configurations are within the scope of the invention. In one embodiment, base plate 132 has the same or substantially the same diameter as upper and lower plates 106, 108 of upper assembly 102.

Lower assembly 104 may generally include one or more vertically-oriented support bars 134; in one embodiment, four (4) support bars 134 originating from four (4) outer apertures 136 on base plate 132, passing through four (4) corresponding outer apertures 138 on lower plate 108, and terminating at four (4) corresponding outer apertures 140 on upper plate 106. Generally, each support bar 134 may have a first end 134a and a second end 134b.

Each set of apertures 136, 138 and 140 (and therefore support bars 134) may be symmetrically spaced from one another and from the centers of base plate 132, lower plate 108 and upper plate 106, respectively. Furthermore, apertures 136, 138 and 140 may be substantially aligned to one another (i.e., in the y-direction). Fastening mechanisms, such as screws 126, may secure support bars 134 to base plate 132 by passing through outer apertures 136 from a bottom surface of base plate 132 and threadedly engaging with first ends 134a of support bars 134. It should be appreciated that, in this configuration, support bars 134 simultaneously pass through outer apertures 138 of lower plate 108. Conversely, fastening mechanisms, such as screws 126, may secure support bars 134 to upper plate 106 by passing through apertures 140 from a top surface of upper plate 106 and threadedly engaging with second ends 134b of support bars 134.

Figure 2:
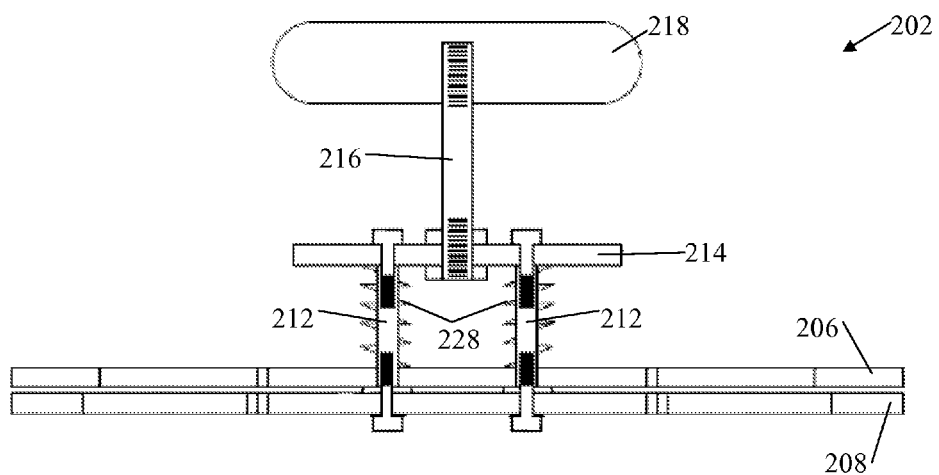
FIG. 2 illustrates a front cross-sectional view of an upper assembly of a beverage mixing apparatus according to an embodiment of the invention.
Figure 3:
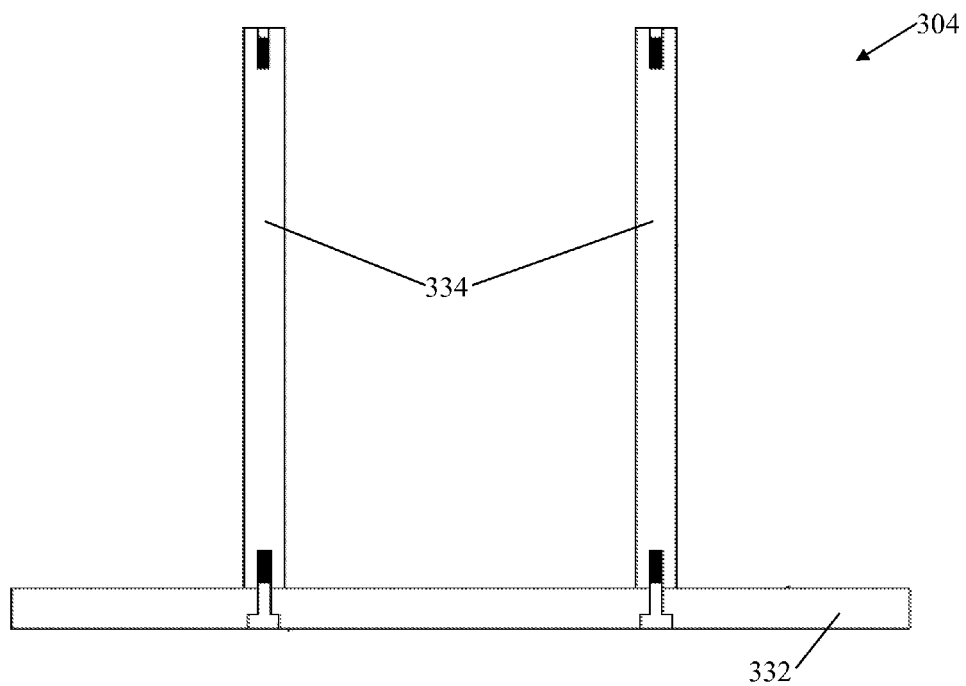
FIG. 3 illustrates a front cross-sectional view of a lower assembly of a beverage mixing apparatus according to an embodiment of the invention.

FIG. 2 illustrates a front cross-sectional view of an upper assembly 202 of a beverage mixing apparatus according to an embodiment of the invention. The components (handle 218 support shaft 216, handle assembly plate 214, spacer bars 212, compression springs 228, upper plate 206, lower plate 208) of the upper assembly 202 are the same or substantially the same of those described with reference to FIG. 1. FIG. 3 illustrates a front cross-sectional view of a lower assembly 304 of a beverage mixing apparatus according to an embodiment of the invention. The components (base plate 332, support bars 334) of the lower assembly 304 are the same or substantially the same of those described with reference to FIG. 1.

Figure 4:
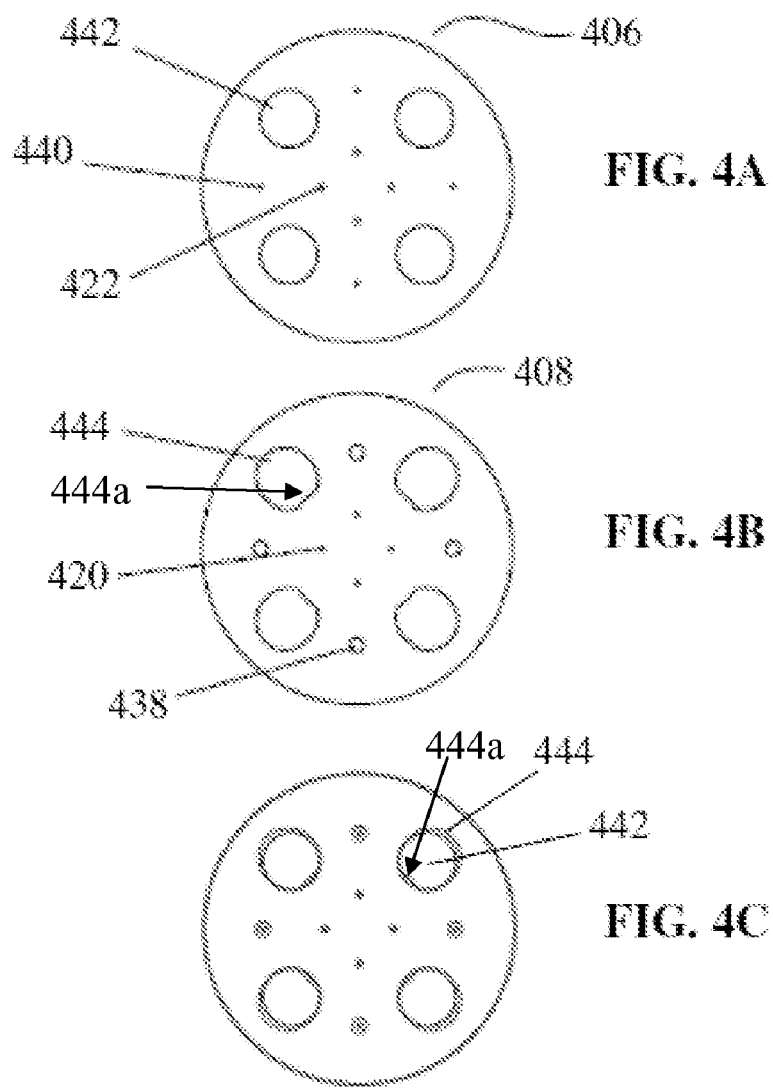
FIGS. 4A-4C illustrate top views of an upper plate, a lower plate and an upper plate in substantial alignment with a lower plate, all components of an upper assembly of a beverage mixing apparatus according to embodiments of the invention.

FIGS. 4A-4C illustrate top views of an upper plate, a lower plate and an upper plate in substantial alignment with a lower plate, all components of an upper assembly of a beverage mixing apparatus according to embodiments of the invention. FIG. 4A illustrates a top view of an upper plate 406 of an upper assembly (not shown) of a beverage mixing apparatus. Upper plate 406 may include a plurality of openings 442 symmetrically spaced about an inner periphery thereof. In one embodiment, openings 442 are about two and one-fourth (2¼) inches in diameter. Apertures 422, 440 correspond to apertures 122, 140 as explained with reference to FIG. 1. FIG. 4B illustrates a top view of a lower plate 408 of an upper assembly (not shown) of a beverage mixing apparatus. Similar to upper plate 406, lower plate 408 may include a plurality of openings 444 symmetrically spaced about an inner periphery thereof. As shown, openings 444 of lower plate 408 may have a shape resembling an elongated circle and may have a protrusion 444a. In one embodiment, openings 444 are about two and one-fourth (2¼) inches in the smallest diameter. Apertures 420, 438 correspond to apertures 120, 138 as explained with reference to FIG. 1. Upper and lower plates 406, 408 may be made of acrylic or any other suitable material.

According to some embodiments, the number of openings 442 on upper plate 406 may be the same as the number of openings 444 on lower plate 408 and may vary between two (2) and eight (8), preferably four (4) or six (6). Furthermore, openings 442 on upper plate 406 may be substantially aligned with, yet slightly off-set relative to, openings 444 on the lower plate 408. FIG. 4C illustrates a top view of upper plate 406 substantially adjacent or adjacent to lower plate 408 showing the off-set nature of openings 442, 444 relative to one another. When aligned, i.e., when upper plate 406 is substantially adjacent or adjacent to lower plate 408 (i.e., in a "captive" state), openings 442 and 444 are capable of receiving a tapered vessel of a first size (not shown) in a "captive", or suspended state. The off-set feature of openings 442, 444 and/or protrusion 444a allows the tapered vessel of a first size to remain in a suspended state until released by operation of the beverage mixing apparatus as explained later herein when referring to FIGS. 7A-7D.

Figure 5:
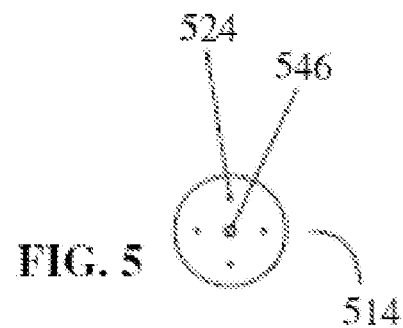
FIG. 5 illustrates a top view of handle assembly plate of an upper assembly of a beverage mixing apparatus according to an embodiment of the invention.

FIG. 5 illustrates a top view of handle assembly plate of an upper assembly of a beverage mixing apparatus according to an embodiment of the invention. Handle assembly plate 514 may include a plurality of apertures 524 which correspond to apertures 124 as explained with reference to FIG. 1. Handle assembly plate 514 also includes an opening 546 to receive a shaft of a handle of a handle assembly as explained with reference to FIG. 1. Handle assembly plate 514 may be made of acrylic or any other suitable material.

Figure 6:
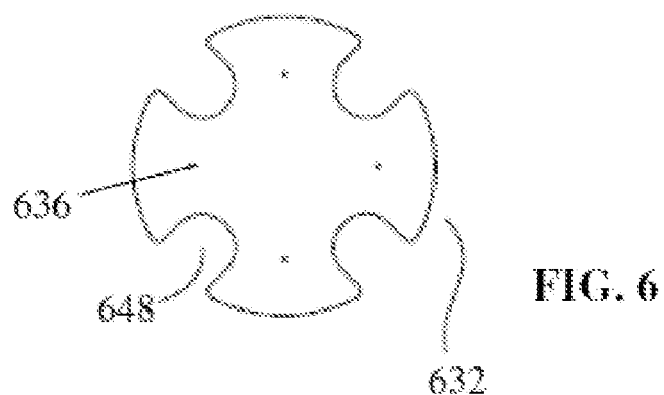
FIG. 6 illustrates a top view of a base plate of a lower assembly of a beverage mixing apparatus according to an embodiment of the invention.

FIG. 6 illustrates a top view of a base plate of a lower assembly of a beverage mixing apparatus according to an embodiment of the invention. Base plate 632 may include a plurality of apertures 636 which correspond to apertures 136 as explained with reference to FIG. 1. Base plate 632 also includes a plurality of contour cut-outs 648 to receive a plurality of vessels as explained below when referring to FIGS. 7A-7D.

FIGS. 7A-7D illustrate a sequence of operating a beverage mixing apparatus according to an embodiment of the invention. FIG. 7A shows beverage mixing apparatus 700 in a first position. Beverage mixing apparatus 700 is "loaded" with a tapered vessel(s) 750 of a first size in overlapping openings 742, 744 of upper assembly 702 and "loaded" with a tapered vessel(s) 752 of a second size in cut-outs 748. Because of the off-set between openings 742 of upper captive plate 706 and openings 744 of lower "release" plate 708, and/or protrusion 444a (FIGS. 4B-C), vessels 750 are "captured" in position until released and cannot fall into the vessels 752. Tapered vessel 750 may be, for example, a shot glass filled with liquor. Tapered vessel 752 may be, for example, a pint glass filled or partially filled with beer, soda, an energy drink or any other non-alcoholic beverage.

Once loaded, the beverage mixing apparatus 700 is an excellent carrier of both the upper and lower tapered vessels 750, 752 due to the openings (see FIGS. 4A-C) of upper and lower plates 706, 708 and cut-outs 748 of base plate 732 being sized to fit snuggly against the taper of the loaded vessels. The cut-outs 748 of base plate 732 have a contour shape (see FIG. 6) that holds the tapered lower vessels 752 in place when the apparatus 700 is lifted to about forty percent (40%) of the tapered lower vessels 752 height thereby securely holding the lower vessel 752 in position for transport. To transport, the multiple vessels the apparatus 700 is lifted by handle 718 and then placed into position (as in FIG. 7A) for activation and service.

FIG. 7B shows beverage mixing assembly 700 in a second position. When handle 718 is depressed, the upper assembly 702 moves downward as guided by the support bars 734 mounted between upper "captive" plate 706 and base plate 732 and through apertures 738 on the lower "release" plate 708. Upper assembly 702 moves as a single unit except for the upper "captive" plate 706 which is stationary as mounted to the top of support bars 734. Compression springs 728, which are captive around the spacer bars 712 and trapped between the handle assembly plate 714 and upper "captive" plate 706, allow the beverage mixing assembly 700 to return to the first position after pressure is removed therefrom. As upper assembly 702 moves to the release position, lower "release" plate 708 separates (see FIG. 7B) from upper "captive" plate 706 allowing tapered vessel 750 to move downward due to the offset openings 744 (see FIG. 4B) moving away from the openings 742 (see FIG. 4A) creating an opening larger than the largest diameter of the tapered vessel 750 (i.e., the mouth of the tapered vessel 750). FIG. 7C shows beverage mixing assembly 700 in a third position. As shown, vessel 750 has been released into vessel 752 creating a mixed cocktail, e.g., a "party bomb," if, of course, the tapered vessel 750 was previously filled with one beverage and the larger tapered vessel 752 was at least partially filled with another beverage. FIG. 7D shows beverage mixing assembly 700 in a fourth position. As shown, lower "release" plate 708 returns to the first position (as do the other components of handle assembly 710. Generally, the compression springs 728 will return the upper assembly 702 to the first position when pressure on handle 718 is removed.

Figures 8A, 8B:
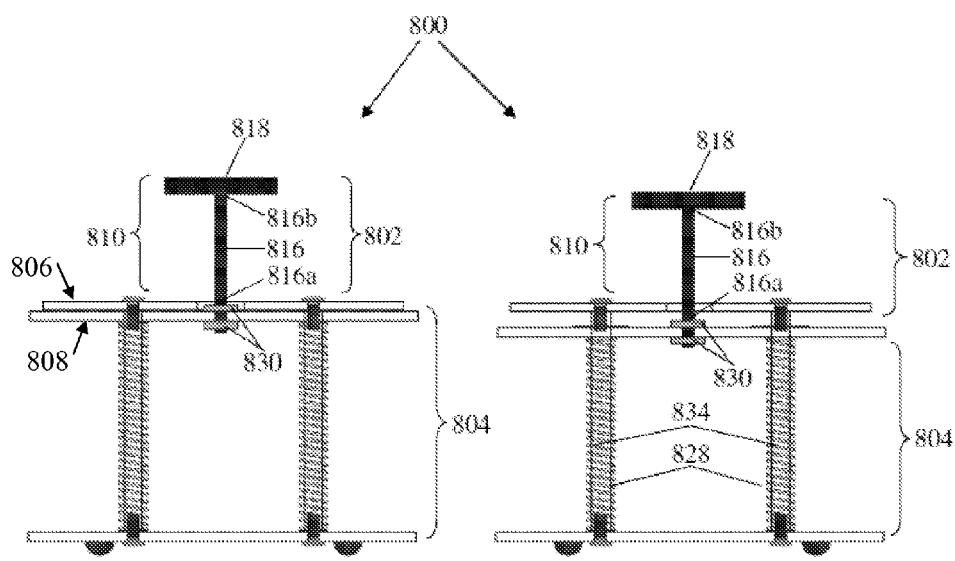
FIGS. 8A-8B illustrate front cross-sectional views of a beverage mixing apparatus according to an alternative embodiment of the invention.

FIGS. 8A-8B illustrate front cross-sectional views of a beverage mixing apparatus according to an alternative embodiment of the invention. Similar to the embodiment illustrated with reference to FIG. 1, beverage mixing apparatus 800 includes an upper assembly 802 connected to a lower assembly 804 and includes substantially all of the features of the beverage mixing apparatus of FIG. 1. However, according to this embodiment, a handle assembly 810 includes a shaft 816 and a handle 818 only wherein shaft 816 passes through a center opening in both upper plate 806 and lower plate 808. That is, handle assembly 810 does not include a handle assembly plate and accompanying components as explained with reference to FIG. 1. In this embodiment, a distal end 816a of shaft 816 is fixed to lower plate 808 by fastening mechanisms 830; however, shaft 816 is not similarly fixed to upper plate 806 and is therefore capable of moving lower plate 808 in a down and return/up direction while upper plate 806 remains stationary. Furthermore, according to this embodiment, compression springs 828 are located about support shafts 834 which allow handle assembly 810 to return to its original position after pressure to it is no longer applied. FIG. 8A illustrates beverage mixing apparatus 800 in a first position, i.e., before pressure is applied to handle assembly 810, while FIG. 8B illustrates beverage mixing apparatus 800 in a subsequent position, i.e., after pressure is applied to handle assembly 810. Beverage mixing apparatus 800 operates in the same or substantially the same manner as described with reference to FIGS. 7A-7D.

While certain exemplary embodiments have been described and shown in the accompanying drawings, it is to be understood that such embodiments are merely illustrative of and not restrictive on the broad invention, and that this invention is not to be limited to the specific constructions and arrangements shown and described, since various other modifications may occur to those ordinarily skilled in the art.

The invention claimed is:

1. A method of preparing a mixed cocktail, comprising in any order the steps of: positioning a plurality of tapered vessels of a first smaller size within a plurality of openings on an upper plate and on a lower plate, the plurality of openings being larger than the mouth of the vessels of the first size and in substantial alignment, yet slightly off-set, relative to one another, the upper plate and the lower plate being adjacent to each other, such that the vessels of the first size are held therein in a suspended state; positioning a plurality of tapered vessels of a second larger size within a plurality of cut-outs on a lower base plate, the plurality of cut-outs being in substantial alignment with said plurality of openings and the base plate being connected to the upper and lower plates by a plurality of support bars passing through a plurality of corresponding symmetrically spaced apertures on each plate, each support bar having a compression spring thereon; pouring a first beverage into the tapered vessels of the first size and a second beverage into the tapered vessels of the second size; applying pressure to a handle assembly connected to the upper and lower plates such that the lower plate separates from the upper plate by moving downward, thus, causing the tapered vessels of the first size to be released into the tapered vessels of the second size, thereby causing the first beverage present in the vessel of the first size to mix with the second beverage present in the vessel of the second size.

2. The method of claim 1, wherein the first beverage is liquor and the second beverage is non-alcoholic.

3. The method of claim 1, wherein the pouring is such that the tapered vessels of the first size are filled with the first beverage and the tapered vessels of the second size are at least partially filled with the second beverage.

4. A beverage mixing apparatus, comprising: an upper plate having a plurality of first openings, each being larger than the mouth of a tapered vessel of a first size; a lower plate adjacent to the upper plate and having a plurality of second openings, each being larger than the mouth of the vessel of the first size and substantially aligned with, yet slightly off-set relative to the plurality of first openings of the upper plate such that to hold in a suspended state vessels of the first size placed therein; a base plate separated from the lower and upper plates by a predetermined distance by a plurality of support bars connecting the base plate to the lower and upper plate such that the lower and upper plate can separate, each support bar having a compression spring thereon, wherein the base plate has a plurality of cut-outs for receiving a plurality of vessels of a second size, larger than the first size, the cut-outs being in substantial alignment with the plurality of first and second openings; and a handle assembly having a support shaft passing through a center opening in the upper plate, such that, when the handle assembly is actuated, the lower plate and upper plate separate, causing each of the suspended vessels of the first size to fall into a corresponding vessel of the second size previously positioned into one of said cut-outs, thus, causing a first beverage present in the vessels of the first size, to mix with a second beverage present in the vessels of the second size.

5. The beverage mixing apparatus of claim 4, wherein the upper and lower plate are separated by the lower plate traveling downwards guided by the plurality of support bars.

6. The beverage mixing apparatus of claim 4, wherein the handle assembly is actuated by pushing it downwards.

7. The beverage mixing apparatus of claim 4, wherein the first beverage is liquor and the second beverage is non-alcoholic.

8. The beverage mixing apparatus of claim 4, wherein the tapered vessels of the first size are filled with the first beverage and the vessels of the second size are at least partially filled with the second beverage.

9. The beverage mixing apparatus of claim 4, wherein the vessels of the second size are tapered and wherein their mouth is larger than said cut-outs such that when the beverage mixing apparatus is lifted the vessels of the second size are suspended within said cut-outs.

10. The beverage mixing apparatus of claim 4, wherein the openings of the lower plate comprise a protrusion for holding in a suspended state the tapered vessels of the first size until the lower plate and the upper plate are caused to separate.

11. The beverage mixing apparatus of claim 4, wherein, when the lower plate is in motion, the upper plate remains stationary.

12. The beverage mixing apparatus of claim 4, wherein the openings in the upper plate have a circular shape and the openings in the lower plate have the shape of an elongated-circle.

13. A beverage mixing apparatus, comprising: an upper plate having a plurality of first openings, each being larger than the mouth of a tapered vessel of a first size; a lower plate adjacent to the upper plate and having a plurality of second openings, each being larger than the mouth of the vessel of the first size and substantially aligned with, yet slightly off-set relative to the plurality of first openings of the upper plate such that to hold in a suspended state vessels of the first size placed therein; a base plate separated from the lower and upper plates by a predetermined distance by a plurality of support bars connecting the base plate to the lower and upper plate such that the lower and upper plate can separate, wherein the base plate has a plurality of cut-outs for receiving a plurality of vessels of a second size, larger than the first size, the cut-outs being in substantial alignment with the plurality of first and second openings; and a handle assembly having a handle assembly plate separated from the upper and lower plates by a plurality of spacer bars connecting the handle assembly plate to the upper and lower plates, the spacer bars having compression springs thereabout, wherein the lower and upper plate separate when pressure is applied to the handle assembly plate, causing each of the suspended vessels of the first size to fall into a corresponding vessel of the second size previously positioned into one of said cut-outs, thus, causing a first beverage present in the vessels of first size, to mix with a second beverage present in the vessels of the second size.

14. The beverage mixing apparatus of claim 13, wherein the upper and lower plate are separated by the lower plate traveling downward guided by the plurality of support bars.

15. The beverage mixing apparatus of claim 13, wherein pressure is applied to the handle assembly plate by pushing it downwards.

16. The beverage mixing apparatus of claim 13, wherein the first beverage is liquor and the second beverage is non-alcoholic.

17. The beverage mixing apparatus of claim 13, wherein the tapered vessels of the first size are filled with the first beverage and the vessels of the second size are at least partially filled with the second beverage.

18. The beverage mixing apparatus of claim 13, wherein the vessels of the second size are tapered and wherein their mouth is larger than said cut-outs such that when the beverage mixing apparatus is lifted the vessels of the second size are suspended within said cut-outs.

19. The beverage mixing apparatus of claim 13, wherein the openings of the lower plate comprise a protrusion for holding in a suspended state the tapered vessels of the first size until the lower plate and the upper plate are caused to separate.

20. The beverage mixing apparatus of claim 13, wherein, when the lower plate is in motion, the upper plate remains stationary.

* * * * *